United States Patent [19]

Kielin et al.

[11] Patent Number: 5,585,083
[45] Date of Patent: Dec. 17, 1996

[54] CATALYTIC PROCESS FOR FORMALDEHYDE OXIDATION

[75] Inventors: Erik J. Kielin, Norfolk; Kenneth G. Brown, Virginia Beach, both of Va.; Christine M. D'Ambrosia, Henrietta, N.Y.

[73] Assignees: The United States as represented by the Administrator of the National Aeronautics and Space Administration, Washington, D.C.; Rochester Gas & Electric Corp., Rochester, N.Y.

[21] Appl. No.: 414,661

[22] Filed: Mar. 30, 1995

[51] Int. Cl.$^6$ .................................................. C07C 11/24
[52] U.S. Cl. ......................... 423/245.3; 423/247; 502/310
[58] Field of Search ........................... 423/245.3, 247; 502/310, 339, 326

[56] References Cited

U.S. PATENT DOCUMENTS

| | | | |
|---|---|---|---|
| 4,524,051 | 6/1985 | Wright et al. | 423/247 |
| 4,528,170 | 7/1985 | Meier zu Koecker et al. | 423/245 |
| 4,536,375 | 8/1985 | Holt et al. | 423/247 |
| 4,855,274 | 8/1989 | Upchurch et al. | 502/339 |
| 4,912,082 | 3/1990 | Upchurch et al. | 502/218 |
| 4,991,181 | 2/1991 | Upchurch et al. | 372/59 |
| 5,009,872 | 4/1991 | Chuang et al. | 423/245.3 |

OTHER PUBLICATIONS

Radel, et al. *Chemistry*, New York West Publishing Co., 1990, p. 426.

*Primary Examiner*—Michael Lewis
*Assistant Examiner*—Amy M. Harding
*Attorney, Agent, or Firm*—George F. Helfrich

[57] ABSTRACT

Disclosed is a process for oxidizing formaldehyde to carbon dioxide and water without the addition of energy. A mixture of formaldehyde and an oxidizing agent (e.g., ambient air containing formaldehyde) is exposed to a catalyst which includes a noble metal dispersed on a metal oxide which possesses more than one oxidation state. Especially good results are obtained when the noble metal is platinum, and the metal oxide which possesses more than one oxidation state is tin oxide. A promoter (i.e., a small amount of an oxide of a transition series metal) may be used in association with the tin oxide to provide very beneficial results.

5 Claims, No Drawings

CATALYTIC PROCESS FOR FORMALDEHYDE OXIDATION

ORIGINAL OF THE INVENTION

The invention described herein was jointly made by employees of the United States Government, contract employees during the performance of work under a NASA contract which is subject to the provisions of Public Law 95-517 (35 USC 202) in which the contractor has elected not to retain title, and an employee of Rochester Gas and Electric Corporation during the performance of work under a Memorandum of Agreement.

BACKGROUND OF THE INVENTION

1. Field of the Invention

This invention relates generally to oxidizing formaldehyde. It relates particularly to a process for oxidizing formaldehyde to carbon dioxide and water, which process includes exposing a gaseous mixture containing formaldehyde and an oxidizing agent to a catalyst of a noble metal dispersed on a metal oxide possessing more than one stable oxidation state.

2. Description of the Related Art

In many applications it is highly desirable, if not necessary, to remove formaldehyde from the medium in which it exists as an unwanted, toxic impurity. By way of example, there has been a long-standing need for a method to remove formaldehyde from indoor air—i.e., breathable air in enclosed spaces such as homes, automobiles, airplanes, hospitals, or industrial plants where the air contains undesirably high concentrations of the toxic formaldehyde. Other significant long-standing needs include the need to remove formaldehyde from compressed air and other oxygen-containing gases, as well as the employment of personal safety masks in the removal of high concentrations of toxic formaldehyde from the ambient atmosphere.

Prior methods employed to remove formaldehyde in such applications include filtering and exhausting to outside air. These methods have been shown to be unsatisfactory for the following reasons: (1) Filters employ a surface on which the species to be removed is adsorbed. The amount of the species to be removed depends on the total number of active surface sites available for adsorption. Once all sites are occupied, the filter ceases to work and must be replaced. (2) Filters in use contain the toxic formaldehyde in adsorbed form and must be disposed of as toxic waste or incinerated. (3) Exhausting to the outside air requires extra duct work and is a source of pollutant formaldehyde to the atmosphere.

It is accordingly a primary object of the present invention to provide an efficient means for removal of formaldehyde from the medium in which it exists as an unwanted, toxic impurity, without the use of filters and further without the addition of energy (e.g., heat).

It is another primary object of the present invention to provide for the removal of formaldehyde from the medium in which it exists as an unwanted, toxic impurity, by presenting a catalytic process for the oxidation of formaldehyde to carbon dioxide and water without the addition of energy (e.g., heat).

SUMMARY OF THE INVENTION

These primary objects and other objects and benefits are achieved by the provision of a process which includes exposing a gaseous mixture comprising formaldehyde and an oxidizing agent to a catalyst comprising from about 1 to about 50 weight percent, based on the total weight of the catalyst, of a noble metal selected from the group consisting of platinum, palladium, gold, silver, and rhodium, which has been dispersed on from about 50 to about 99 weight percent, based on the total weight of the catalyst, of a metal oxide which possesses more than one stable oxidation state.

Very beneficial results are achieved by means of a preferred embodiment wherein the gaseous mixture comprising formaldehyde and an oxidizing agent is ambient air containing formaldehyde, the noble metal is platinum, and the metal oxide which possesses more than one stable oxidation state comprises tin oxide.

Especially good results are obtained from another preferred embodiment wherein the metal oxide which possesses more than one stable oxidation state consists of tin oxide in association with a promoter selected from the group consisting of oxides of the metals of the transition series of the periodic table of the elements, the promoter being present in an amount sufficient to provide from about 1 to about 12 atom percent of promoter metal to tin metal.

When no promoter is employed in association with the tin oxide of the catalyst, to attain the highest catalyst activity per unit mass of catalyst material, it is preferred to employ platinum in an amount sufficient to provide about 15 weight percent, based on the total weight of catalyst, with the remainder of the catalyst being unpromoted tin oxide. However, for more practical applications when the highest catalyst activity per unit mass of noble metal is desirable, it is preferred to employ platinum in an amount sufficient to provide about 1 weight percent, based on the total weight of the catalyst, with the remainder of the catalyst being unpromoted tin oxide.

When a promoter is employed in association with the tin oxide of the catalyst, it is especially preferred that the promoter be present in an amount sufficient to provide about 3 atom percent of promoter metal to tin metal.

DESCRIPTION OF THE PREFERRED EMBODIMENTS

The catalyst for formaldehyde oxidation according to the present invention consists of a noble metal dispersed on a metal oxide possessing more than one stable oxidation state. Noble metals include platinum, palladium, gold, silver, and rhodium and comprise from 1 to 50 percent of the catalyst by weight with the balance (50–99 percent) being the metal oxide. The metal oxides upon which the noble metal is dispersed include tin oxide, either pure or promoted with small amounts of the oxides of the transition series metals (i.e. iron, manganese, copper, cobalt, nickel, etc.). The composition of the oxide can vary from 1 to 12 atom percent of promoter metal to tin metal. Especially good results are found with 15 percent by weight of platinum with the balance being unpromoted tin oxide. For promoted catalyst formulations, best results are obtained when the promoter concentration is approximately 3 atom percent of promoter metal to tin metal. The catalyst can exist as a powder, or it can be prepared as a coating on supports such as granules, pellets, honeycomb monoliths, or fabrics.

A catalyst employed in the present inventive process is prepared as follows:

The preparation of similar powder catalysts or catalysts coated on silica gel, silica beads, or pellets has been presented in our earlier U.S. Patents "Process for Making a Noble Metal on Tin Oxide Catalyst," U.S. Pat. No. 4,855, 274, "Catalyst for Carbon Monoxide Oxidation," U.S. Pat. No. 4,912,082, and "Catalyst for Carbon Monoxide Oxidation," U.S. Pat. No. 4,991,181.

Preparation of platinum-tin oxide-based catalyst coatings for pellets, beads, granules, fabrics, and especially ceramic honeycomb monoliths is accomplished by successive layering of the desired components, as follows: (1) a clean, dry substrate is deaerated in a solution containing tin (II) 2-ethylhexanoate (SnEH, hereafter). The substrate is removed from the solution, and excess solution is removed from the substrate. Residual solution components are evaporated leaving an SnEH layer on the substrate which is thermally decomposed in air to tin oxide at 300° C. Several layers are applied in the same manner to achieve the desired loading of tin oxide. (2) If desired, a promoter is added to the catalyst matrix in a similar fashion. For example, an iron oxide promoter is added to an existing tin oxide-coated substrate by deaerating in an iron nitrate solution, removing excess solution, evaporating of solvent, and finally thermally decomposing the nitrate to oxide. (3) Platinum is added to the coated substrate as above using an aqueous solution of tetraamine platinum (II) dihydroxide or other platinum salt, with chloride-free salts being preferred, and then thermally decomposing the salt. Instead of The thermal decomposition, a reductive decomposition can be used. For example, the catalyst coated substrate is heated in an atmosphere containing a reducing gas such as carbon monoxide or hydrogen to induce reduction of the platinum salt to platinum.

The instant process operates merely by passing a gaseous mixture containing formaldehyde plus oxygen or other oxidizing agent (such as air or the nitrogen oxides) over the catalyst using any of a number of methods well known in the art, and monitoring the gas composition both upstream and downstream of the catalyst. The catalyst (1) adsorbs both the formaldehyde and the oxidizing agent, (2) enables reaction between the adsorbates without the addition of energy, and then (3) desorbs the oxidation products, thereby freeing sites for more adsorption and reaction to occur. The catalyst operates efficiently over a range of temperatures. The lower bound of the temperature range has not yet been established; however, the catalyst operates efficiently as low as $-5°$ C. Catalyst activity increases with increasing temperature; no upper bound has yet been established. Notably, no input of energy (i.e., heating) is necessary for oxidation activity.

In a test according to the present invention, 0,030 grams of catalyst comprising 12 percent platinum by weight, with the remainder tin oxide supported on a ceramic monolith, achieved complete conversion of 7500 ppm formaldehyde in air to carbon dioxide for a continuous period of greater than 15 days. The catalyst temperature was 25° C.

In another test according to the present invention, 0.063 grams of the aforementioned catalyst achieved complete conversion of greater than 3000 ppm of formaldehyde in air to carbon dioxide at temperatures from 25° C. to 0° C. As the temperature was further decreased to $-5°$ C. some carbon dioxide retention on the catalyst surface was noted.

The present invention is a significant improvement over the prior art in that: (1) the process works by oxidizing formaldehyde to $CO_2$ and $H_2O$, nontoxic components already found in air. Unlike the filters of the prior art, the active sites of the catalyst adsorb formaldehyde only long enough to convert it to $CO_2$ and $H_2O$. Consequently, the sites again become available for adsorption/oxidation of more formaldehyde. Although catalysts eventually degrade, they require replacement much less often than filters. (2) The catalyst in the present process does not retain formaldehyde, and therefore does not constitute a waste problem as filters do. (3) The catalyst in the present process converts formaldehyde to harmless gaseous components already found in air and therefore does not contribute to outside air pollution, unlike prior art systems which simply exhaust inside air to the outside. (4) The catalyst in the present process does not require the addition of energy/heat to work. It works at temperatures as low as $-5°$ C. (5) The catalyst in the present invention oxidizes formaldehyde over a range of oxygen concentrations from stoichiometric amounts to nearly pure oxygen.

We claim:

1. A process for the oxidation of formaldehyde to carbon dioxide and water which undergoes initiation at temperatures from about $-5°$ C. to about 25° C., which process comprises exposing a gaseous mixture comprising formaldehyde and an oxygen containing oxidizing agent to a catalyst comprising from about 1 to about 50 weight percent, based on the total weight of the catalyst, of a noble metal selected from the group consisting of platinum, palladium, gold, silver, and rhodium, which has been dispersed on from about 50 to about 99 weight percent, based on the total weight of the catalyst, of a metal oxide which possesses more than one stable oxidation state including at least tin oxide, the carbon dioxide produced from oxidation with said oxidizing agent consisting of the product of oxidizing formaldehyde with said noble metal tin oxide catalyst.

2. The process of claim 1, wherein: the gaseous mixture comprising formaldehyde and an oxidizing agent is ambient air containing formaldehyde; the noble metal is platinum; and the metal oxide which possesses more than one stable oxidation state comprises tin oxide.

3. The process of claim 2, wherein the metal oxide which possesses more than one stable oxidation state consists of tin oxide in association with a promoter selected from the group consisting of oxides of the metals of the transition series of the periodic table of the elements, the promoter being present in an amount sufficient to provide from about 1 to about 12 atom percent of promoter metal to tin metal.

4. The process of claim 3, wherein the promoter is present in an amount sufficient to provide about 3 atom percent of promoter metal to tin metal.

5. The process of claim 2, wherein the catalyst comprises about 15 weight percent of platinum, based on the total weight of the catalyst, with the remainder of the catalyst being unpromoted tin oxide.

\* \* \* \* \*

UNITED STATES PATENT AND TRADEMARK OFFICE
CERTIFICATE OF CORRECTION

PATENT NO. : 5,585,083
DATED : December 17, 1996
INVENTOR(S) : Erik J. Kielin, Kenneth G. Brown, and Christine M. D'Ambrosia It is certified that error appears in the above-indentified patent and that said Letters Patent is hereby corrected as shown below:

On the title page, under item [19], delete "Kielin" and insert --Schryer--.

On the title page, item [75] should read:

[75] Inventors: David R. Schryer, Hampton; Billy T. Upchurch, Virginia Beach; George M. Wood, Newport News; Erik J. Kielin, Norfolk; Kenneth G. Brown, Virginia Beach, all of Va.; Christine M. D'Ambrosia, Henrietta, N.Y.

Signed and Sealed this

Twenty-eighth Day of October, 1997

Attest:

BRUCE LEHMAN

*Attesting Officer*  *Commissioner of Patents and Trademarks*